United States Patent
Jung et al.

(10) Patent No.: US 8,081,701 B2
(45) Date of Patent: Dec. 20, 2011

(54) METHOD FOR SENDING AND RECEIVING COMMUNICATION SIGNALS, AND APPARATUSES FOR SENDING AND RECEIVING COMMUNICATION SIGNALS

(75) Inventors: Peter Jung, Otterberg (DE); Guido Horst Bruck, Voerde (DE); Tobias Scholand, Muelheim a.d. Ruhr (DE); Christoph Spiegel, Oberhausen (DE)

(73) Assignee: Infineon Technologies AG, Neubiberg (DE)

( * ) Notice: Subject to any disclaimer, the term of this patent is extended or adjusted under 35 U.S.C. 154(b) by 723 days.

(21) Appl. No.: 12/191,608

(22) Filed: Aug. 14, 2008

(65) Prior Publication Data

US 2009/0279622 A1    Nov. 12, 2009

(30) Foreign Application Priority Data

Aug. 17, 2007 (EP) .................... 07016196

(51) Int. Cl.
  *H04L 1/02* (2006.01)
  *H04K 1/02* (2006.01)
(52) U.S. Cl. ........................ 375/267; 375/296
(58) Field of Classification Search .......... 375/260, 375/267, 295–296, 299, 346–350; 455/101, 455/114.2, 114.3
  See application file for complete search history.

(56) References Cited

U.S. PATENT DOCUMENTS

| | | | |
|---|---|---|---|
| 7,496,147 B2 * | 2/2009 | Baier et al. | 375/267 |
| 2006/0067426 A1 * | 3/2006 | Maltsev et al. | 375/297 |
| 2009/0067533 A1 * | 3/2009 | Yuan et al. | 375/267 |

FOREIGN PATENT DOCUMENTS

| | | |
|---|---|---|
| EP | 1 605 653 A2 | 12/2005 |
| EP | 1 628 414 A2 | 2/2006 |

OTHER PUBLICATIONS

T.D. Tuyen, T.D. Tan, T.A. Vu, H.H. Tue, Performance of STBC MIMO-OFDM Using Pilot-Aided Channel EStimation and Adaptive Pre-distortion, 2009 International Conference on Advanced Technologies for Communications.*

"Re-configurable Linear Precoders to Compensate for Antenna Correlation in Orthogonal and Quasi-Orthogonal Space-Time Block Coded Systems", Angeliki Alexiou and Mohammed Qaddi, IEEE, 2004, pp. 665-669.

"Space Diversity Schemes for STBC-Based MIMO Systems and Pre-FDE SIMO Systems", Xu Xin, Cai Yueming and Xu Youyun, IEEE, 2005, pp. 1160-1164.

"Pre-Equalization for MIMO Wireless Channels with Delay Spread", Hamanth Sampath, Helmut Bölcskei and Arogyaswami J. Paulraj, IEEE, 2000, pp. 1175-1178.

"A Quasi-Orthogonal Space-Time Block Code", Hamid Jafarkhani, IEEE, 2000, pp. 42-45.

* cited by examiner

*Primary Examiner* — Khanh C Tran
(74) *Attorney, Agent, or Firm* — Eschweiler & Associates, LLC

(57) ABSTRACT

In a method for sending communication signals, space-time block coding is performed by dividing a data stream of complex-value data symbols into a number $K_T > 2$ of partial data streams of respectively $n > 2$ data symbols. The data symbols in the partial data streams are used to form $n \times K_T$ matrix $C_{K_T}$. Transmitter-end predistortion is performed by using the matrix $C_{K_T}$ to form a matrix D, and the data symbols are sent by $K_T$ transmission antennas according to their arrangement in the matrix D.

17 Claims, 2 Drawing Sheets

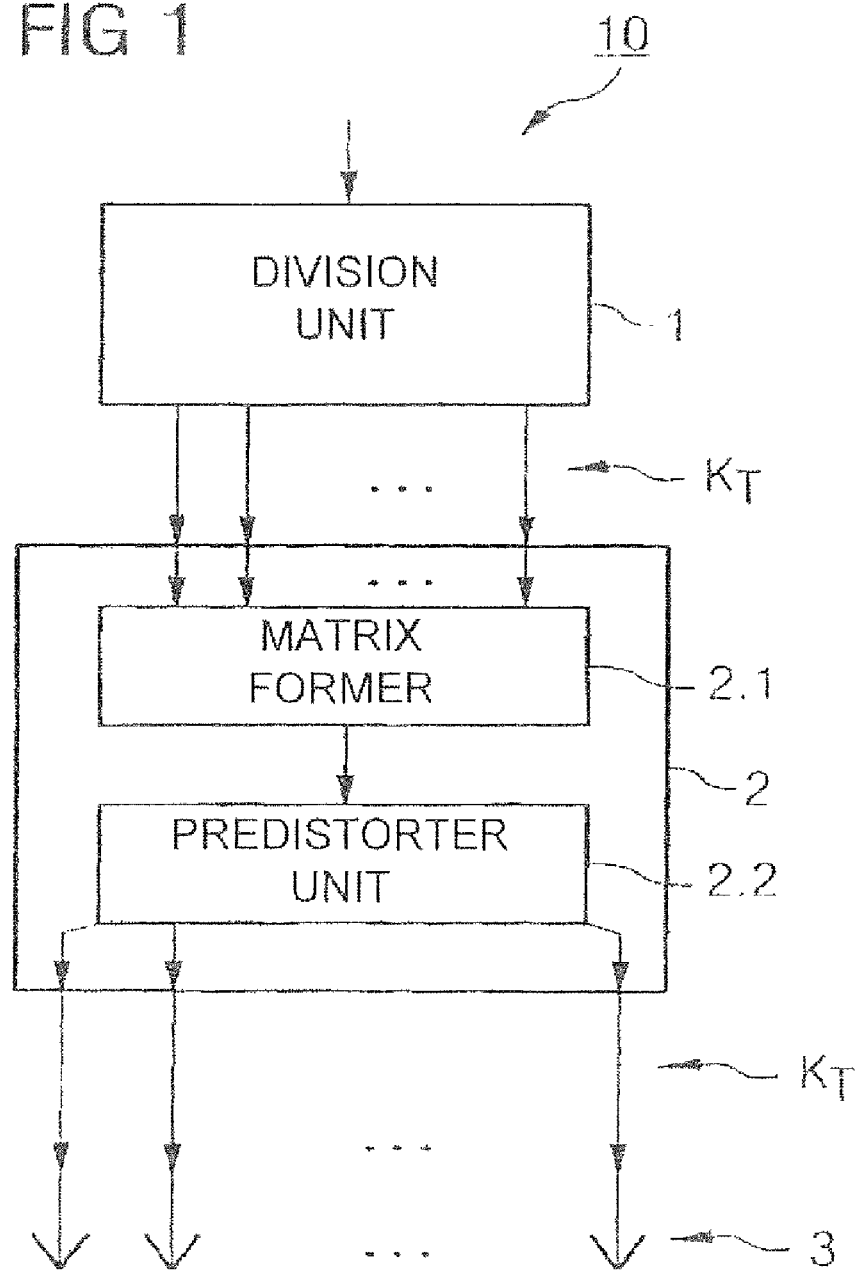

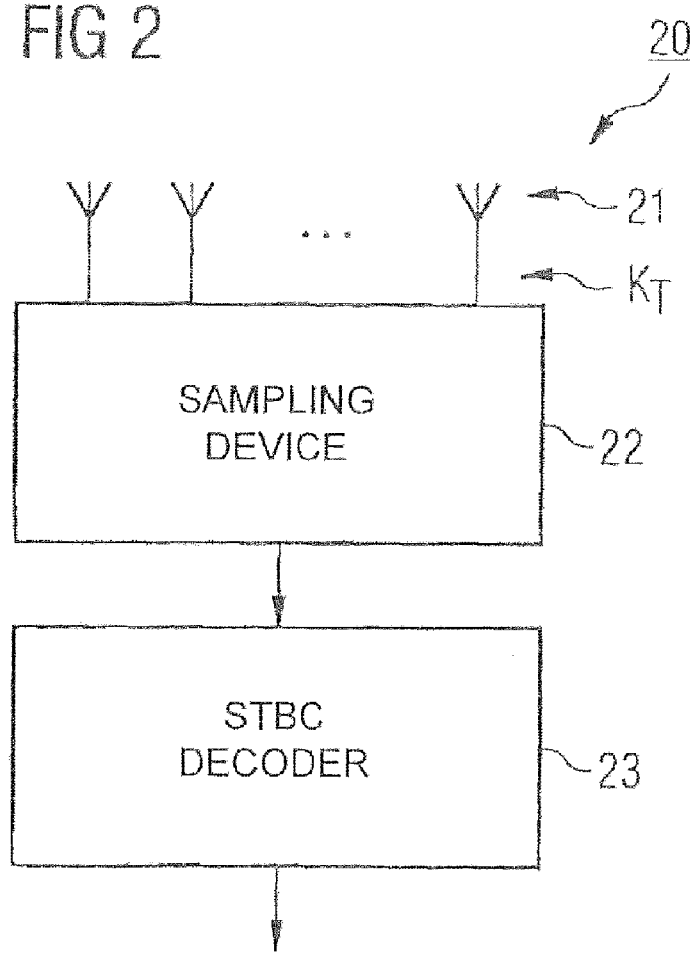

METHOD FOR SENDING AND RECEIVING COMMUNICATION SIGNALS, AND APPARATUSES FOR SENDING AND RECEIVING COMMUNICATION SIGNALS

The present invention relates to a method for sending communication signals, a method for receiving communication signals, an apparatus for sending communication signals and an apparatus for receiving communication signals.

BACKGROUND

An important task of future mobile radio systems is the provision of services at high data rates. In today's digital cellular mobile radio networks of the second generation, for example based on the GSM standard, or of the third generation, for example based on the UMTS standard, the network operators provide their customers with a multiplicity of services. Besides the basic services such as voice telephony, SMS (Short Message Service) and MMS (Multimedia Message Service), video services and IP (Internet Protocol)-based packet data services are also provided.

In view of the success of DSL in the landline domain, the trend in mobile radio is likewise moving toward high-speed mobile radio systems optimized for IP applications (for example VoIP). The current expansion of UMTS with the label HSPA (High Speed Packet Access), also referred to as the 3.5G system, allows maximum net transmission speeds of up to 14 Mbps in the downlink (base station to mobile terminal) and up to 2 Mbps in the uplink (mobile terminal to base station). To ensure that the UMTS system is competitive in the future too, work is currently in progress on the further development of UMTS to produce a mobile radio system which is optimized for IP packet data transmission by improving the system capacity and spectral efficiency.

The aim is to significantly increase the maximum net transmission speeds in future, particularly up to 100 Mbps in the downlink and 50 Mbps in the uplink.

It is expected that at least one transmission direction in the communication system will use OFDM-based signal transmission (Orthogonal Frequency Division Multiplexing). OFDM is a multicarrier method in which block modulation is used to transmit a block with a number of data symbols in parallel on an appropriate number of subcarriers. The sum total of all subcarriers forms what is known as an OFDM symbol for the duration of a data block.

To meet the requirements regarding data rate, however, better utilization of the limited radio resources than is the case in current mobile radio networks is also required. In this respect, systems having a plurality of antennas both on the transmitter and on the receiver provide the option of increasing spectral efficiency through the use of spatial signal characteristics. These developments are covered by the term transmission diversity. At present, discussions are therefore ongoing regarding the use of what are known as MIMO systems (MIMO=Multiple-Input Multiple-Output) in third-generation radio networks and in future WLAN standards (WLAN=Wireless Local Area Network).

An important method for improving the reception conditions and hence possibly increasing the data rate of a communication link is provided by what are known as space-time codes (STCs). It is an aim of a method using these codes to improve the channel characteristics through targeted utilization of spatial diversity by using a plurality of transmission antennas and possibly a plurality of reception antennas. In this case, the use of space-time codes in the downlink of a mobile radio system, for example, is of particular interest, since increased implementation complexity extends only to the base stations and hence it is possible to achieve higher capacity for the downlink of the cellular network and at the same time the implementation complexity for the receivers can be kept down.

One option which has been described for space-time codes is space-time block codes, subsequently also referred to as space-time block coding, for example in the publication "A Simple Transmit Diversity Technique for Wireless Communications" in IEEE Journal on Selected Areas in Communication, 16(8), pages 1451-1458 (1988) by S. M. Alamouti. In space-time block coding, a signal is sent by a first transmission antenna and further transmission antennas send delayed variants of the signal sent by the first transmission antenna. In the permutation scheme, the modulated signal is sent by a first transmission antenna and permutations of the modulated signal are sent by further transmission antennas. Consequently, the signal sent by the transmission antennas can be derived from a matrix which comprises data words in the form of the modulated signal and permutations of the modulated signal. The space-time coding codes a signal into a plurality of data words, and each data word is sent by a different transmission antenna. During sending, the data words are spread over a single carrier frequency in the time domain by sending the data symbols in each data word successively in a single-carrier method.

In the matrix of an STBC, the transmission antennas are usually shown along one axis and the times or timeslots are shown along the other axis. If an STBC data block has T timeslots and codes k data symbols, a code rate r is defined as r=k/T. The space-time block coding was originally introduced for orthogonal STBCs, in which the matrix is such that any two antenna vectors of the matrix are orthogonal with respect to one another. The aforementioned publication by Alamouti describes an orthogonal STBC for two transmission and reception antennas with the code rate 1. In the case of more than two transmission and reception antennas, only orthogonal STBCs for which the code rate is less than 1 are known. Although such STBCs utilize the entire diversity potential of the transmission channel, they do not permit maximum throughput on account of the code rate of less than 1. Besides the orthogonal STBCs, quasi-orthogonal STBCs are also known, in which the relevant vectors are orthogonal with respect to one another only in the case of some of the pairs of antenna vectors. However, it is not known to date how to achieve transmission with a code rate equal to 1 using a quasi-orthogonal STBC when there are fewer than four transmission and reception antennas.

A further development based on an OFDM method relates to a combination of OFDM and MIMO, i.e. sending and receiving via a plurality of paths using a respective plurality of transmission and reception antennas on the stations communicating with one another. The combination of OFDM with MIMO, subsequently also referred to as MIMO-OFDM, advantageously allows the complexity of the space-time signal processing to be reduced.

BRIEF DESCRIPTION OF THE DRAWINGS

The invention is explained in more detail below by way of example with reference to the drawings, in which:

FIG. 1 shows a schematic block diagram of an embodiment of an apparatus for sending communication signals;

FIG. 2 shows a schematic block diagram of an embodiment of an apparatus for receiving communication signals; and FIG. 3 shows an exemplary embodiment of an STBC block matrix for carrying out the method according to the invention.

DETAILED DESCRIPTION

FIG. 1 schematically shows an exemplary embodiment of an apparatus for sending communication signals in a block form. First, the transmission apparatus 10 has a division unit 1. A data stream of complex-value data symbols in the time domain is supplied to the division unit 1 at an input. The division unit 1 is used to divide the data stream of complex-value data symbols into a number $K_T$ of partial data streams of data symbols, wherein $K_T \geq 2$ and the partial data streams respectively contain a number n of data symbols and $n > 2$. By way of example, the division unit 1 may be provided by a serial/parallel converter which can output the $K_T$ partial data streams at $K_T$ outputs of the serial/parallel converter. The transmission apparatus 10 also has a space-time block (STBC) coder 2. The $K_T$ partial data streams which are output by the division unit 1 are supplied to the STBC coder. The STBC coder 2 has a matrix former 2.1 and a predistorter unit 2.2. The $K_T$ partial data streams are supplied to the matrix former 2.1. The matrix former 2.1 forms an $n \times K_T$ matrix $C_{K_T}$ from the data symbols in the partial data streams. The matrix $C_{K_T}$ is output by the matrix former 2.1 at an output and is supplied to the predistorter unit 2.2 at an input. The predistorter unit 2.2 uses the matrix $C_{K_T}$ to form a new matrix D. This predistortion is used to allow a reception apparatus to be implemented as easily and with as little complexity as possible, as will be explained further below.

The transmission apparatus 10 also has a number $K_T$ of transmission antennas 3 for sending the data symbols. The inputs of the $K_T$ transmission antennas 3 are connected to outputs of the predistorter unit 2.2 and to corresponding outputs of the STBC coder 2, so that the data symbols to be sent can be distributed over the $K_T$ transmission antennas 3 of the transmission apparatus 10 according to their matrix D formed in the predistorter unit 2.2.

FIG. 2 schematically shows an exemplary embodiment of an apparatus for receiving communication signals which have been sent by an apparatus based on the exemplary embodiment in FIG. 1, in a block form. The reception apparatus 20 has a number $K_T$ of reception antennas 21. The outputs thereof are connected to corresponding inputs of a sampling device 22 in the reception apparatus 20. The sampling device 22 produces receive samples of the communication signals received by the reception antennas 21. The receive samples produced are supplied to an output of the sampling device 22, which output is connected to an input of a space-time block (STBC) decoder 23. The STBC decoder 23 has an output for outputting the decoded data signals.

By way of example, the matrix $C_{K_T}$ may be formed by the matrix of an orthogonal or quasi-orthogonal STBC for the $K_T$ transmission and reception antennas. To allow the receiver to be implemented easily, the predistortion may be provided by orthogonal predistortion. In particular, the predistortion may be provided such that it is formed from the quasi-orthogonal matrix $C_{K_T}$ in the following manner:

$$\underline{D} = (\underline{C}_{K_T}^T \underline{C}_{K_T})^{-1} \underline{C}_{K_T}^T \quad (1)$$

or $$\underline{D} = \underline{C}_{K_T}^T (\underline{C}_{K_T} \underline{C}_{K_T}^T)^{-1}. \quad (2)$$

In this case, in the reception apparatus 20 in FIG. 2, the matrix $C_{K_T}$ needs to be used only in the STBC decoder 23, i.e. the matrix $C_{K_T}$ needs to be multiplied by the receive samples 22 delivered by the sampling device 22. In particular, it holds that $$\underline{C}_{K_T} \cdot (\underline{C}_{K_T}^T \underline{C}_{K_T})^{-1} \underline{C}_{K_T}^T = \underline{C}_{K_T} \cdot \underline{C}_{K_T}^{-1} (\underline{C}_{K_T}^T)^{-1} \underline{C}_{K_T}^T = I \quad (3)$$

or $$\underline{C}_{K_T} \cdot \underline{C}_{K_T}^T (\underline{C}_{K_T} \underline{C}_{K_T}^T)^{-1} = I, \quad (4)$$

wherein I is the $K_T \times K_T$ unit matrix. The reception apparatus 20 therefore forms simple linear combinations of the receive samples for the purpose of a decoding. Every reception antenna 21 of the reception apparatus 20 has transmission signals from every transmission antenna 3 of the transmission apparatus 10 in FIG. 1 on it which are orthogonally predistorted in the manner described. Since the matrix multiplication on the basis of the above equation (4) produces the unit matrix, only linear combinations of the receive samples are formed. For example, the matrix multiplication on the basis of the above equation (4) can be implemented by means of linear filtering using a suitably selected filter whose filter characteristics or filter coefficients can be taken from the elements of the $C_{K_T}$ matrix.

The number $K_T$ of transmission and reception antennas is at least three, in the exemplary embodiment of the use of a quasi-orthogonal matrix $C_{K_T}$, that is to say quasi-orthogonal linear space-time block codes and conversion of the matrix $C_{K_T}$ into the matrix D on the basis of equations (1) and (2), described above, a code rate of 1 can be attained when transmitting the communication signals, and hence maximum throughput can be achieved. The linearity of the STBCs allows the favorable implementations of the transmission apparatus and of the reception apparatuses. The transmission-end predistortion, particularly the predistortion by converting the matrix $C_{K_T}$ into the matrix D, allows particularly low-complexity implementation of the reception apparatus, since only simple linear combinations need to be formed therein by multiplying the receive samples by the matrix $C_{K_T}$. This is of particular interest for the downlink, since a somewhat more complex base station faces simple mobile reception apparatuses.

The apparatus for sending communication signals which is shown in FIG. 1 can be considered to be an exemplary embodiment of hardware implementation of the method for sending communication signals. Equally, the apparatus for receiving the communication signals which is shown in FIG. 2 can be considered to be a hardware implementation of the method for receiving the communication signals. The methods for sending and receiving communication signals which are illustrated here can also respectively be implemented as a computer program product which comprises program code sections for carrying out the respective method, however. Such a computer program product may be stored on a recording medium and loaded into a microcontroller or DSP for execution when needed.

The method for sending communication signals can be carried out both for a single-carrier method and for a multi-carrier method, for example an OFDM method. In the case of the OFDM method, spectral coding produces the discrete complex-value spectrum associated with each OFDM symbol, which spectrum is usually separated according to real and imaginary parts for the further processing with digital circuit components, from an initial continuous data stream. Inverse discrete Fourier transformation of the spectrum can be used to calculate the likewise complex-value samples of the OFDM symbol. During inverse discrete Fourier transformation, M discrete-time samples can be produced, for example. These are then supplied as a data stream to the division unit 1 in the transmission apparatus in FIG. 1. The sum total of all subcarriers forms the OFDM symbol for the duration of a data block. Ultimately, every subcarrier can be handled independently of all other subcarriers. This also means that every subcarrier can have its own $C_{K_T}$ matrix, but does not necessarily have to have one.

The method can therefore also be used in conjunction with a single-carrier method. An initial data stream is first of all mapped onto usually complex-value data symbols, which may be 64-QAM data symbols or else 8-PSK data symbols, for example, as are used in W-LAN, UMTS and EDGE. These data symbols are combined to form blocks, each block being able to contain M data symbols. If such a block is then interpreted as a data vector d with M elements arranged in a column, and if it is also assumed that the data are intended to be sent in parallel on adjacent, narrowband subcarriers, then a signal is accordingly produced in the time domain by the inverse discrete Fourier transformation. The inverse discrete Fourier transformation is then represented by a square, unitary M×M matrix L. The discrete-time output signal b=L·d for the inverse discrete Fourier transformation has M samples $b_1$, $b_2$, $b_M$. By way of example, there are $K_T=4$ antenna elements and M=256. The vector b is then divided into $K_T=4$ vectors ($b_1$, $b_2$, $b_3$ and $b_{KT}$) of equal length. One of the matrices from the above equations (1) and (2) is then applied to the n-th respective elements of these vectors.

In the case of a single-carrier-specific approach, the matrix L would not be applied to the vector d first and then one of the matrices in equations (1) and (2). Instead, one of the matrices from equations (1) and (2) would be applied to the data stream directly, specifically such that subcarrier-specific single STBC matrices could be implemented.

FIG. 3 shows an exemplary embodiment of a quasi-orthogonal matrix $C_{K_T}$. This matrix $C_{K_T}$ relates to the case in which four antenna elements are provided. The matrix is quasi-orthogonal and is therefore distinguished in that only single pairs of column vectors are orthogonal with respect to one another, and others again are not. Such a matrix can be used as an STBC matrix for a method for sending communication signals.

The invention claimed is:

1. A method for sending communication signals; in which space-time block coding is performed, comprising;
    dividing a data stream of complex-value data symbols into a number $K_T$ of partial data streams of data symbols, wherein $K_T>2$, and wherein a number n of data symbols in each partial data stream is greater than 2 data symbols;
    arranging the data symbols in the partial data streams to form an n×$K_T$ matrix $C_{K_T}$;
    performing transmitter-end predistortion using the matrix $C_{K_T}$ to form a matrix D comprised of transmission data symbols; and
    transmitting the transmission data symbols as communication signals using $K_T$ transmission antennas according to an arrangement of the transmission data symbols in the matrix D.

2. The method of claim 1, wherein the matrix $C_{K_T}$ is used to form the matrix D according to:

$$D=(\underline{C}_{K_T}{}^T\underline{C}_{K_T})^{-1}\underline{C}_{K_T}{}^T \text{ or}$$

$$D=\underline{C}_{K_T}{}^T(\underline{C}_{K_T}\underline{C}_{K_T}{}^T)^{-1}.$$

3. The method of claim 1, wherein the matrix $C_{K_T}$ is orthogonal or quasi-orthogonal.

4. The method of claim 1, wherein a multicarrier method is used for transmitting the transmission data symbols.

5. The method of claim 4, wherein the multicarrier method comprises an OFDM method.

6. The method of claim 1, wherein a single-carrier method is used for transmitting the transmission data symbols.

7. The method of claim 1, further comprising:
    spectral coding an initial bit data stream to obtain a discrete complex-value spectrum; and
    obtaining the data stream of complex-value data symbols, by means of inverse discrete Fourier transformation of the complex-value spectrum.

8. The method of claim 1, further comprising:
    receiving the transmission data symbols as communication signals and performing sampling thereon to form samples; and
    supplying the receive samples to a space-time block decoder.

9. The method of claim 8, further comprising multiplying the receive samples using the matrix $C_{K_T}$.

10. The method of claim 9, wherein the multiplying comprises linear filtering the receive samples using a filter having filter characteristics or filter coefficients that are derived from the matrix $C_{K_T}$.

11. An apparatus for sending communication signals, comprising:
    a division unit configured to divide a data stream comprising complex-value data symbols into a number $K_1$ of partial data streams, wherein $K_T>2$, and wherein each partial data stream comprises a number n of data symbols, wherein n>2;
    a space-time block coder comprising a matrix forming component configured to form an n×$K_T$ matrix $C_{K_T}$ from the data symbols in the partial data streams, and a pre-distorter unit configured to perform transmitter-end predistortion by forming a matrix D from the matrix $C_{K_T}$; and
    a number $K_T$ of transmission antennas configured to transmit the data symbols as communication signals according to their arrangement in the matrix D.

12. The apparatus of claim 11, wherein the predistorter unit is configured to form the matrix D according to:

$$D=(\underline{C}_{K_T}{}^T\underline{C}_{K_T})^{-1}\underline{C}_{K_T}{}^T \text{ or}$$

$$D=\underline{C}_{K_T}{}^T(\underline{C}_{K_T}\underline{C}_{K_T}{}^T)^{-1}.$$

13. The apparatus of claim 11, wherein the matrix forming component is configured to form the matrix $C_{K_T}$ as an orthogonal or quasi-orthogonal matrix.

14. The apparatus of claim 11, further comprising:
    a Fourier transformation unit configured to transform the data stream of pre-distored complex-value data symbols into a time-domain communication signal using inverse discrete Fourier transformation.

15. The apparatus of claim 11, further comprising:
    $K_T$ reception antennas configured to receive time-domain communication signals from the transmission antennas;
    a sampling device configured to produce receive samples from the time-domain communication signals; and
    a space-time block decoder configure to decode the receive samples to generate decoded data signals.

16. The apparatus of claim 15, wherein the space-time block decoder is configured to multiply the receive samples by the matrix $C_{K_T}$.

17. The apparatus of claim 15, wherein the space-time block decoder comprises a filter comprising filter characteristics or filter coefficients that are derived from the matrix $C_{K_T}$.

* * * * *